US008202338B2

(12) United States Patent
Lajtonyi

(10) Patent No.: US 8,202,338 B2
(45) Date of Patent: Jun. 19, 2012

(54) CYCLONE SEPARATOR FOR BLAST FURNACE GAS

(76) Inventor: Alex Lajtonyi, Burlington (CA)

( * ) Notice: Subject to any disclaimer, the term of this patent is extended or adjusted under 35 U.S.C. 154(b) by 1006 days.

(21) Appl. No.: 11/994,250

(22) PCT Filed: Jun. 13, 2006

(86) PCT No.: PCT/EP2006/005653

§ 371 (c)(1), (2), (4) Date: Jul. 17, 2008

(87) PCT Pub. No.: WO2007/000242

PCT Pub. Date: Jan. 4, 2007

(65) Prior Publication Data

US 2009/0197753 A1 Aug. 6, 2009

(30) Foreign Application Priority Data

Jun. 29, 2005 (EP) .................................... 05076498

(51) Int. Cl.
*B01D 45/12* (2006.01)

(52) U.S. Cl. .......... 55/419; 55/447; 55/459.1; 55/459.2; 55/459.4; 209/719; 209/721

(58) Field of Classification Search .................. 209/719, 209/721; 55/419, 447, 459.1, 459.2, 459.4
See application file for complete search history.

(56) References Cited

U.S. PATENT DOCUMENTS

| | | | |
|---|---|---|---|
| 3,802,164 | A | 4/1974 | Bowen |
| 6,610,115 | B1 | 8/2003 | Hegemann et al. |

FOREIGN PATENT DOCUMENTS

| | | |
|---|---|---|
| DE | 19920237 | 5/2000 |
| FR | 1355017 | 3/1964 |
| FR | 1395282 | 4/1965 |
| GB | 29196 | 0/1911 |
| WO | 0218056 | 3/2002 |

*Primary Examiner* — David A Reifsnyder

(57) ABSTRACT

The invention relates to a cyclone separator for blast furnace gas including: a cyclone vessel having a central axis and including a side wall, a top wall and bottom wall; a first inlet duct connected with an end to the side wall of the cyclone vessel at a predetermined position intermediate the top and bottom wall; and a central outlet duct which traverses through the top wall of the cyclone vessel and extends into the cyclone vessel, and a further inlet duct connected with an end to the side wall of the cyclone vessel in circumferentially spaced relationship to the first inlet duct.

13 Claims, 2 Drawing Sheets

CYCLONE SEPARATOR FOR BLAST FURNACE GAS

This application is a §371 National Stage Application of International Application No. PCT/EP2006/005653, filed on 13 Jun. 2006, claiming the priority of European Patent Application No. 05076498.4 filed on 29 Jun. 2005.

The present invention relates to a cyclone separator for cleaning blast furnace gas.

A known blast furnace gas cleaning system generally includes a preliminary cleaning stage and a fine cleaning stage. The preliminary cleaning stage usually employs a gravity dustcatcher comprising a dustcatcher vessel. The blast furnace gas enters the dustcatcher vessel vertically through an increasing cross section diffuser duct where its velocity is reduced causing coarse dust particles to separate from the gas stream before the gas flow leaves the gravity dustcatcher at the top after reversal of direction. The separated dust particles are collected in a bottom hopper and periodically removed via a lock at the bottom of the dustcatcher vessel.

As this type of dustcatchers achieves poor separation efficiency it has been suggested to pass the blast furnace gas also through a cyclone separator before entering the fine cleaning stage.

Blast furnace gas cleaning systems in which the dustcatcher is replaced by a single large tangential cyclone separator have also been build in the past. A large pipe, the so-called downcomer, from the top of the blast furnace to the cyclone vessel, transports the blast furnace gas. The downcomer is tangentially connected to the cyclone vessel to induce a swirling motion of the gas and, thus, separate the dust particles. However, a large cyclone separator of this type has not gained wide popularity; e.g. the tangential connection of the downcomer (with cross sections of up to 4 meters) to the cyclone is considered rather difficult to make.

Likewise, blast furnace gas cleaning systems in which the dustcatcher is replaced by a single large axial cyclone separator have also been built in the past. The downcomer from the top of the blast furnace is connected to a distribution device from which the two inlet ducts branch off to a dome inside the cyclone vessel. The dome is designed to introduce the blast furnace gas into the cyclone vessel in an axial direction. Below the dome guide vanes are arranged, which cause a swirl motion of the gas in the cyclone vessel and, thus, separate the dust particles. The guide vanes are installed in a removable manner in flanged nozzles to facilitate replacement as they are exposed to high abrasive wear. This design solves the problem with the problematic inlet connection of the tangential cyclone, however, a large axial cyclone separator of this type has not gained wide popularity; e.g. because of the complicated and expensive design of the removable guide vanes and the expected high rate of abrasive wear which the guide vanes are exposed to.

Therefore, it is an object of this invention to provide an improved cyclone vessel for blast furnace gas.

It is a further object of the invention to provide a blast furnace gas cleaning system which has a high separation efficiency and which does not have the above mentioned disadvantages of the known solutions.

According to the invention there is provided a blast furnace gas cyclone separator according to claim 1.

The blast furnace gas cyclone separator comprises a cyclone vessel, a first and second inlet duct and an outlet duct, which traverses through the top wall of the cyclone vessel and extends into the vessel. The inlet ducts are connected to the side wall, preferably a generally cylindrical side wall, of the cyclone vessel at a predetermined position intermediate the top and bottom wall of said cyclone vessel. The second inlet duct is connected to said side wall in circumferentially spaced relationship to the first inlet duct. This introduces the blast furnace gas in a tangential direction into the cyclone vessel causing a whirling motion of the gas in the cyclone vessel. Dust particles are thrown to the outer wall of the cyclone vessel by the centrifugal force and slide down, e.g. to a dust-collecting hopper at the bottom wall of the cyclone vessel.

A more homogeneous inflow of the blast furnace gas into the cyclone vessel is obtained by the plurality of inlet ducts. Together with the absence of frontal impacts of the gas flow on parts of the construction, the more homogeneous inflow also reduces the local wear at the place of connection of the inlet ducts on the side wall of the cyclone vessel.

Preferably, the ends of the inlet ducts are offset relative to the central axis of said cyclone vessel. This improves a swirling motion of the gas in the cyclone vessel, and thus an improved centrifugal force on the duct particles.

According to a preferred embodiment, each end of each inlet duct in the vicinity of the side wall of the cyclone vessel is inclined in downward direction towards the side wall of the cyclone vessel. The blast furnace gas is thus introduced in the cyclone vessel in a downward direction, improving the flow of the gas through the cyclone.

Preferably, the inclination of the ends of the inlet ducts has a minimum inlet angle of 65° and a maximum inlet angle of 85° with the central axis of the cyclone vessel. More preferably, the inlet angle is between 70° and 75°. It has been found that between these angles the cyclone separator has the best performance.

A preferred embodiment of the cyclone separator comprises a distribution device connected to the downcomer and the inlet ducts. A symmetrical type of distribution device for blast furnace gas substantially simplifies the connection of the downcomer gas duct from the furnace top with the cyclone vessel. The downcomer can be connected from above to the distribution device and thus be supported vertically above the cyclone separator. Separate supporting structures for lateral loads on a distribution device and/or inlet ducts caused by the gas flow changing direction can be dispensed with.

Preferably, at least in the upper region of the cyclone vessel, guide means for guiding the gas entering the cyclone vessel and/or inducing swirl are absent. Without a complicated inlet dome and replaceable guide vanes, the costs of construction and maintenance are greatly reduced.

The cleaned blast furnace gas is removed at the top end of the cyclone vessel through a central vertical outlet duct, which can be connected to a fine cleaning stage. The outlet duct extends into the cyclone vessel, traverses the top wall of the cyclone vessel and is arranged between the inlet ducts.

In order that the invention may be more fully understood, reference will now be made, by way of example, to the accompanying drawings, in which.

Figure 1:
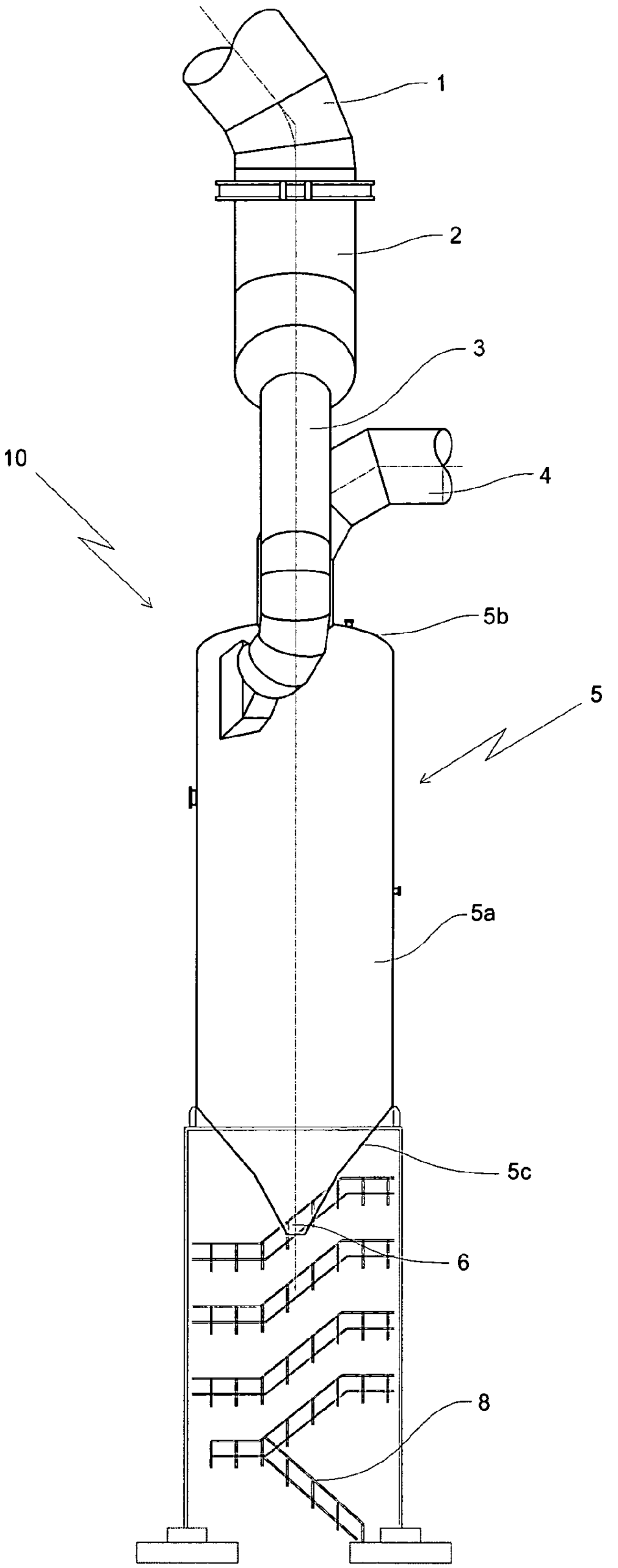
FIG. 1 is a front view of the blast furnace gas cyclone separator according to the invention.

FIG. 1 shows a front view of a cyclone separator 10 for cleaning blast furnace gas. The blast furnace gas comes from the downcomer 1 and is fed to the cyclone vessel 5 by a distribution device 2. The downcomer is essentially a large diameter pipe, which extends downwards from the top of the blast furnace. The diameter of the downcomer is about four meters. The distribution device is connected to the downcomer and distributes the blast furnace gas over the inlet ducts 3, 13 (see FIG. 2). In a preferred embodiment of the blast furnace gas cyclone separator according to the invention with a configuration with two inlet ducts 3, 13 the shape of the distribution device 2 looks like an upside down 'Y'. The inlet duct 3, 13 is curved and tangential connected to the cyclone vessel 5. The cross-section of the inlet duct 3, 13 changes at the tangential connection from round to rectangular. The tangential connections of the inlet ducts have a predetermined slope in respect to the (usually vertical) axis of the cyclone vessel 5 causing the blast furnace gas to swirl well in the cyclone vessel. Due to the right dimensioning, shape and connection of the inlet ducts 3, 13 it is not necessary to provide any guiding grooves or vanes to direct the blast furnace gas flow in the cyclone vessel 5. The blast furnace gas swirls from the inlet ducts 3, 13 at the top wall 5*b* to the bottom wall 5*c* of the cyclone vessel 5. The shape of the bottom wall 5*c* directs the swirl to the centre of the cyclone vessel and also functions as a dustcollector. The blast furnace gas is then led into the outlet duct 4 to the next stage in the process. The separated dust remains at the bottom wall 5*c* and can be automatically discharged via an outlet nozzle 6 to a pug mill or pug pipe (not shown). FIG. 1 further shows the landing 8 to reach the outlet nozzle 6. Reproduction of the landing 8 gives a good impression of the huge dimensions of the cyclone separator.

Figure 2:
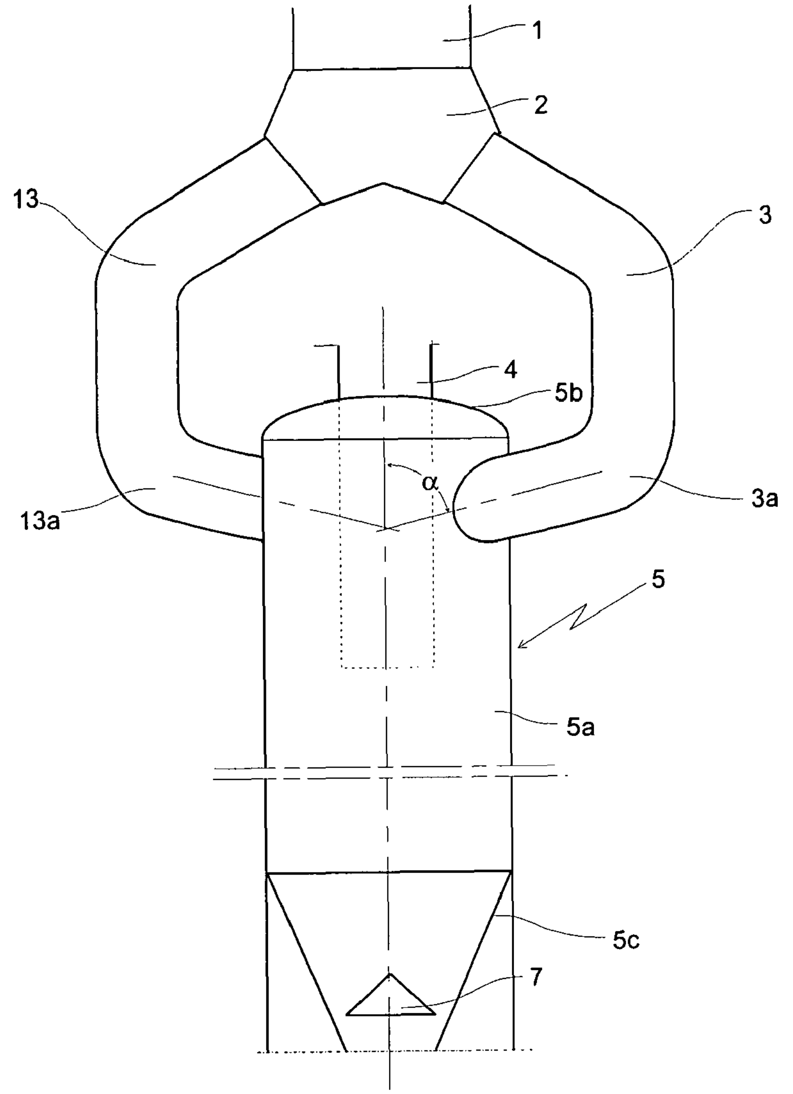
FIG. 2 is a schematic side view of a part of the blast furnace gas cyclone separator according to FIG. 1.

FIG. 2 shows a side view, the lower part in cross section, of a part of the cyclone separator. At the top it shows the inverted 'Y'-shaped distribution device 2 in connection with the downcomer 1 and the inlet ducts 3, 13. FIG. 2 shows the inlet angle α, which defines the angle between the inlet duct and the vertical axis of the cyclone vessel. This angle α is to be measured as the angle between the centre line of the end 3*a* or 13*a* of the inlet duct 3 or 13 and the centre line of the cyclone vessel 5 when a plane through the centre line of the end 3*a* or 13*a* of the inlet duct 3 or 13 parallel to the centre line of the cyclone vessel 5 is viewed at right angles. By varying this parameter it is possible to obtain a high separation efficiency. An inlet angle α close to 90° causes interference between the downward swirl and the reversed flow of the blast furnace gas, which results in a unstable separation process and a poor separation efficiency. Therefor a maximum inlet angle α of 85° is preferred for the design of the cyclone separator. The maximum separation efficiency is reached with an inlet angle between 70° and 75°. The ends 3*a*, 13*a* of the inlet ducts 3, 13 are connected to the cyclone vessel 5 at substantially the same height of the cyclone vessel. Further FIG. 2 shows the axially aligned outlet duct 4, which traverses through the top wall of the cyclone vessel 5 and points to an apex 7. The separated dust being collected at the bottom wall 5*b* slides under the apex 7 to the outlet nozzle 6 and the blast furnace gas reverses upward by the apex 7 into the outlet duct 4.

Figure 3:
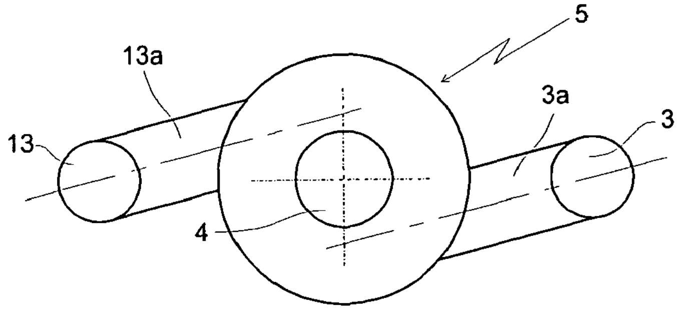
FIG. 3 is a schematic top view of the blast furnace gas cyclone separator of FIG. 2.

FIG. 3 shows a top view of the vessel 5 with the inlet ducts 3, 13 and the outlet duct 4. Here it can be seen that the end 3*a*, 13*a* of the inlet ducts 3, 13 are offset relative to the central axis of the cyclone vessel 5, thus providing a swirling flow of the blast furnace gas in the cyclone vessel 5. The ends 3*a*, 13*a* of the inlet ducts 3, 13 are shown as being substantially round in FIGS. 2 and 3, but are preferably rectangular as shown in FIG. 1.

It will be understood by the person skilled in the art that many alterations can be made to the cyclone separator for blast furnace gas as described above, without departing from the scope of the attached claims.

The invention claimed is:

1. Cyclone separator for blast furnace gas comprising:

a cyclone vessel having a central axis and including a side wall, a top wall and bottom wall;

a first inlet duct connected with an end to said side wall of said cyclone vessel at a predetermined position intermediate the top and bottom wall;

a second inlet duct connected with an end to said side wall of said cyclone vessel in circumferentially spaced relationship to the first inlet duct;

the first and second inlet ducts being connected to each other by a distribution device, which has a connection with a conduit to feed the blast furnace gas from above the cyclone vessel;

a central outlet duct which traverses through the top wall of the cyclone vessel and extends into said cyclone vessel;

wherein the ends of said first and second inlet ducts in the vicinity of the side wall of the cyclone vessel are inclined in downward direction towards the side wall of the cyclone vessel between a minimum inlet angle α of 65° with the central axis of the cyclone vessel and a maximum inlet angle α of 85° with the central axis of the cyclone vessel.

2. Blast furnace gas cyclone separator according to claim 1, wherein the ends of the first and second inlet ducts are offset relative to the central axis of said cyclone vessel.

3. Blast furnace gas cyclone separator according to claim 1, wherein each end of each of the first and second inlet ducts in the vicinity of the side wall of the cyclone vessel is inclined in downward direction towards the side wall of the cyclone vessel with the inlet angle (α) between 70° and 75° with the central axis of the cyclone vessel.

4. Blast furnace gas cyclone separator according to claim 1, wherein the cross section of each of the first and second inlet ducts changes at its respective connection to the side wall of the cyclone vessel from round to rectangular.

5. Blast furnace gas cyclone separator according to claim 4, further comprising an outlet nozzle at a lower end of the cyclone for discharging solids separated from gas by the cyclone.

6. Blast furnace gas cyclone separator according to claim 4, wherein each end of each of the first and second inlet ducts in the vicinity of the side wall of the cyclone vessel is inclined in downward direction towards the side wall of the cyclone vessel with an inlet angle (α) between 70° and 85° with the central axis of the cyclone vessel.

7. Blast furnace gas cyclone separator according to claim 6, wherein the sidewalls are directly connected to the top wall and the central outlet duct only traverses through the top wall of the cyclone vessel.

8. Blast furnace gas cyclone separator according to claim 7, wherein an upper portion of the cyclone extending from where the central outlet duct traverses through the top wall of the cyclone vessel to a lower end of the central outlet duct is empty but for the central outlet duct.

9. Blast furnace gas cyclone separator according to claim 7, wherein an upper portion of the cyclone extending from where the central outlet duct traverses through the top wall of the cyclone vessel to a lower end of the central outlet duct has an absence of guiding grooves and vanes.

10. Blast furnace gas cyclone separator according to claim 7, wherein the bottom wall is conical with a downward taper for directing a swirl of gas and solids to the center of the cyclone.

11. Blast furnace gas cyclone separator according to claim 7, wherein the ends of the first and second inlet ducts are offset relative to the central axis of said cyclone vessel, and wherein the second inlet duct and the first inlet duct are connected to respective opposed portions of the side wall with the central outlet duct between the locations at which the second inlet duct and the first inlet duct are connected to the side wall.

12. Blast furnace gas cyclone separator according to claim 11, wherein inlet ducts to the cyclone consist of the first inlet duct and the second inlet duct.

13. Blast furnace gas cyclone separator according to claim 1, wherein the entire portion of the cyclone defined within the side wall extending between the top wall and the bottom wall is empty but for the central outlet duct.

* * * * *